(12) United States Patent
Richardson et al.

(10) Patent No.: US 8,775,474 B2
(45) Date of Patent: *Jul. 8, 2014

(54) EXPOSING COMMON METADATA IN DIGITAL IMAGES

(75) Inventors: Cyra S Richardson, Bellevue, WA (US); Peter A Gurevich, Woodinville, WA (US); Saurabh D Mehta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

This patent is subject to a terminal disclaimer.

(21) Appl. No.: 11/771,808

(22) Filed: Jun. 29, 2007

(65) Prior Publication Data

US 2009/0006474 A1    Jan. 1, 2009

(51) Int. Cl.
  *G06F 7/00*  (2006.01)
  *G06F 17/30*  (2006.01)

(52) U.S. Cl.
  CPC ............................... *G06F 17/30265* (2013.01)
  USPC ........... 707/793; 707/805; 709/203; 709/225; 715/201; 715/202; 715/203; 715/764

(58) Field of Classification Search
  USPC ........... 707/793, 805; 709/203, 225; 715/201, 715/202, 203, 764
  See application file for complete search history.

(56) References Cited

U.S. PATENT DOCUMENTS

| | | | |
|---|---|---|---|
| 6,223,190 B1 * | 4/2001 | Aihara et al. | 715/234 |
| 6,408,301 B1 | 6/2002 | Patton et al. | |
| 6,523,046 B2 * | 2/2003 | Liu et al. | 707/104.1 |
| 6,833,146 B2 * | 12/2004 | Valencia et al. | 426/74 |
| 6,859,909 B1 | 2/2005 | Lerner et al. | |
| 6,871,231 B2 | 3/2005 | Morris | |
| 6,874,084 B1 | 3/2005 | Dobner et al. | |
| 6,954,543 B2 * | 10/2005 | Svendsen et al. | 382/102 |
| 7,028,058 B2 | 4/2006 | Russon | |
| 7,111,022 B1 * | 9/2006 | Matsumoto et al. | 707/203 |
| 7,127,473 B2 | 10/2006 | Agassi et al. | |
| 7,162,691 B1 | 1/2007 | Chatterjee et al. | |
| 7,197,158 B2 * | 3/2007 | Camara et al. | 382/100 |
| 7,519,573 B2 | 4/2009 | Helfman et al. | |
| 2002/0124172 A1 | 9/2002 | Manahan | |
| 2002/0184491 A1 | 12/2002 | Morgan et al. | |
| 2003/0028762 A1 | 2/2003 | Trilli et al. | |

(Continued)

OTHER PUBLICATIONS

Hearst, et al., "Finding the FL Site Sear", available at least as early as Feb. 2, 2007, at <<http://citeseer.ist.psu.edu/cache/papers/cs/26984/http:zSzzSzwww.ai.mit.eduzSzpeoplezSzjim-mylinzSzpaperszSzHearst02.pdf/hearst02finding.pdf>>, ACM, vol. 45, No. 9, 2002, pp. 42-49.

(Continued)

*Primary Examiner* — Shew-Fen Lin
(74) *Attorney, Agent, or Firm* — Andrew Sanders; Micky Minhas; Wolfe-SBMC (57) ABSTRACT

Common metadata exposure with digital images involves making image metadata types that are common across multiple image file formats accessible via an application programming interface (API). In an example embodiment, a browser exposes an image metadata API that may be called with reference to a preselected image metadata name. The browser determines an image metadata value that is associated with the preselected image metadata name from image metadata of a targeted image. When the image metadata value is returned to a caller of the image metadata API, the caller may consume or present the image metadata value in any manner.

20 Claims, 9 Drawing Sheets

(56) References Cited

U.S. PATENT DOCUMENTS

| | | | |
|---|---|---|---|
| 2003/0159153 A1* | 8/2003 | Falvo et al. | 725/110 |
| 2004/0103426 A1 | 5/2004 | Ludvig et al. | |
| 2004/0153378 A1 | 8/2004 | Perkowski | |
| 2005/0044112 A1* | 2/2005 | Yamamoto et al. | 707/104.1 |
| 2005/0046817 A1 | 3/2005 | Wolfe et al. | |
| 2005/0182792 A1 | 8/2005 | Israel et al. | |
| 2005/0268100 A1 | 12/2005 | Gasparini et al. | |
| 2005/0289124 A1 | 12/2005 | Kaiser et al. | |
| 2006/0018506 A1 | 1/2006 | Rodriguez et al. | |
| 2006/0053293 A1 | 3/2006 | Zager et al. | |
| 2006/0112067 A1* | 5/2006 | Morris | 707/1 |
| 2006/0149700 A1 | 7/2006 | Gladish et al. | |
| 2006/0184554 A1 | 8/2006 | Albert et al. | |
| 2006/0184576 A1* | 8/2006 | Albert et al. | 707/104.1 |
| 2006/0184783 A1 | 8/2006 | Albert et al. | |
| 2006/0204134 A1 | 9/2006 | Modrall et al. | |
| 2006/0218403 A1 | 9/2006 | Sauve et al. | |
| 2006/0230056 A1 | 10/2006 | Aaltonen | |
| 2006/0242178 A1 | 10/2006 | Butterfield et al. | |
| 2007/0016492 A1 | 1/2007 | Linker et al. | |
| 2007/0055689 A1 | 3/2007 | Rhoads et al. | |
| 2007/0073756 A1* | 3/2007 | Manhas et al. | 707/101 |
| 2007/0098266 A1 | 5/2007 | Chiu et al. | |
| 2007/0171473 A1* | 7/2007 | Iwasaki | 358/1.18 |
| 2007/0255734 A1 | 11/2007 | Morimoto | |
| 2007/0256003 A1 | 11/2007 | Wagoner et al. | |
| 2008/0098300 A1 | 4/2008 | Corrales | |
| 2008/0256434 A1 | 10/2008 | Morris | |
| 2009/0006471 A1 | 1/2009 | Richardson | |

OTHER PUBLICATIONS

"Preliminary Workflow", available at least as early as Feb. 2, 2007, at <<http://media.wiley.com/product_data/excerpt/22/07821443/0782144322.pdf>>, pp. 1-24.

Vogl, "The Use of Technical Metadata in Still Digital Imaging by the Newspaper Industry", available at least as early as Feb. 2, 2007, at <<https://ritdml.rit.edu/dspace/simple-search?query=%22The+Use+of+technical+Metadata+in+still+digital+imaging+by+the+newspaper+industry%22&submit.x=10&submit.y=9>>, Jul. 2005, pp. 1-98.

Verisign Inc., "Licensing verisign certificates: securing multiple web server and domain configurations", www.msctrustgate.com/pdf/licensing.pdf, white paper,(2001).

Herzberg, Amir et al., "Protecting valve web users, or preventing spoofing and establishing credential sites", www.cs.bu.ac.il/~herzea/papers/ecommerce/trusted_credentials_area.pdf, Bar Ilan University,(Jul. 2004).

Ncipher Inc., "Protecting commercial secure web servers from key-finding treats", www.ncipher.com/uploads/resources/pcws.pdf, white paper,(1999).

"Non-Final Office Action", U.S. Appl. No. 11/771,580, (Sep. 3, 2009),21 pages.

"Final Office Action", U.S. Appl. No. 11/771,580, (Mar. 11, 2010),24 pages.

"Final Office Action", U.S. Appl. No. 11/771,580, (Oct. 22, 2010),28 pages.

"Non-Final Office Action", U.S. Appl. No. 11/771,580, (Aug. 3, 2010),24 pages.

"Final Office Action", U.S. Appl. No. 11/771,580, (Jun. 9, 2011),25 pages.

"Non-Final Office Action", U.S. Appl. No. 11/771,580, (Mar. 25, 2011),21 pages.

Batholomew, "Manage Your Photos with F-Spot", Retrieved from: <http://www.linuxjournal.com/article/9110?page=0,0> on Feb. 28, 2014, Oct. 1, 2006, 11 pages.

* cited by examiner

EXPOSING COMMON METADATA IN DIGITAL IMAGES

BACKGROUND

Digital images from digital cameras and other sources are proliferating over the internet. They are being stored at different locations as well as being transferred to and from different devices. Digital images are also being shared in a variety of manners. A multitude of programs and internet-based services exist to facilitate the use and enjoyment of digital images in these various situations. However, such programs and internet-based services fail to fully exploit the potential of having images in digital form.

SUMMARY

Common metadata exposure with digital images involves making image metadata types that are common across multiple digital image file formats accessible via an application programming interface (API). In an example embodiment, a browser exposes an image metadata API that may be called with reference to a preselected image metadata name. The browser determines an image metadata value that is associated with the preselected image metadata name from image metadata of a targeted image. In another example embodiment, a browser has access to a common image metadata mapping data structure that maps respective preselected image metadata names to respective metadata type identification tags for different image file formats. The image metadata of a targeted image may include mapped associations between respective metadata type identification tags and respective image metadata values for the targeted image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction to Exposing Common Metadata in Digital Images

Existing internet-based digital image services can store multiple images for each of multiple users. These images are stored by a server and are typically accessed by a user with a web browser. In operation, a user through a web browser requests to view a number of images stored by the service at a web server. The web server retrieves the requested images from storage that is associated with the web server.

First, the server identifies the images that the customer wants to view. Second, the server software creates the header (or beginning of) a, e.g., HyperText Markup Language (HTML) page. Third, the server software creates the rest of the HTML page, and it adds each requested image from the image storage. Fourth, in the processes of creating the HTML surrounding each image, the server software typically extracts some of the metadata fields, like keywords, from the image file and adds that metadata as static text to the HTML.

While the resulting web page display can satisfy basic consumer desires to view the image and a limited quantity of image metadata, it has two primary problems. First, the process does not scale well at the server. For an internet-based service having millions of customers with thousands or even tens of thousands of images apiece, the server can be required to perform billions of reads. A system in which the server performs processing (as opposed to primarily storage) has to scale in relationship to the number of users, which is less cost effective than a system in which the processing is performed on the client. Secondly, this approach reduces the flexibility offered to a web page developer when designing an image-focused web page display. Specifically, the interactive capabilities offered to the user of the web browser at a client device with respect to the displayed web page are extremely limited. For example, the user cannot ask the web browser to display different image metadata or to change the image metadata without a complete round trip back to the server. That round trip may require the server to re-generate the entire page with the requested metadata or may require the server to parse the image metadata and re-send the parsed image metadata.

In contrast, certain example embodiments as described herein involve a browser that includes an image metadata API. Script that runs on the browser at the client device can make calls to the image metadata API. An image metadata API call can reference a particular image metadata type for a targeted image using a preselected image metadata name. The image metadata API then returns to the script an image metadata value from the targeted image that is associated with the particular image metadata type. The browser can display the image metadata value in relation to the image in a displayed page. By way of example only, a particular image metadata type for a given image file format of a targeted image may be associated with a preselected image metadata name in a common image metadata mapping data structure.

EXAMPLE EMBODIMENTS FOR EXPOSING COMMON METADATA IN DIGITAL IMAGES

1: Introduction—Overview and Example Environments

Figure 1:
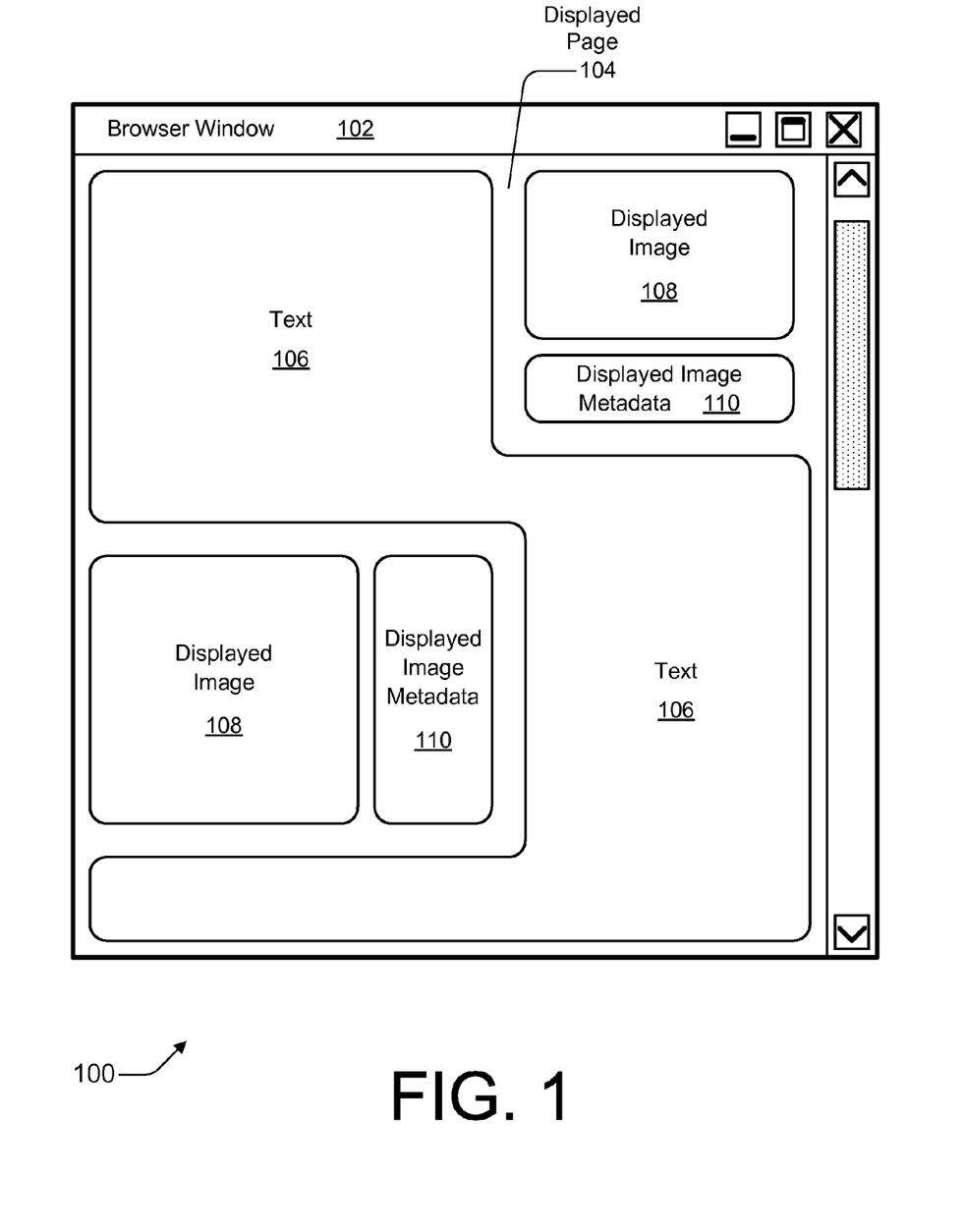
FIG. 1 is a block diagram of a browser window illustrating example displayed image and displayed image metadata results for an implementation of common metadata exposure with digital images.

FIG. 1 is a block diagram 100 of a browser window 102 illustrating displayed image 108 and displayed image metadata 110, which are example results for an implementation of common metadata exposure with digital images. As illustrated, browser window 102 contains a displayed page 104. Displayed page 104 includes text 106, at least one displayed image 108, and at least one displayed image metadata 110.

In an example embodiment, a displayed page 104 includes a displayed image 108 and displayed image metadata 110 that is related thereto. Which particular image metadata value or values that are associated with a given image are presented as part of displayed image metadata 110 is controllable by scripting code that is running within a browser. By way of example only, displayed page 104 may comprise a web page, an intranet page, another network-related page, any page that may be displayed by a browser, some combination thereof, and so forth. More generally, images and selective image metadata data may be presented via displaying on a display screen, via printing on hard copy with a printer, and so forth. A browser window may be manifested in hard copy by borders, framing, edges, etc. around the printed images and printed image metadata data. Examples of image metadata are described herein below.

Although two combinations of displayed image 108 and associated displayed image metadata 110 are explicitly shown within browser window 102 in FIG. 1, fewer or more than two may alternatively be displayed. Also, in addition to below and beside the displayed image 108, displayed image metadata 110 may be positioned elsewhere with respect to its associated displayed image metadata 110. Moreover, image information 108/110 may be displayed in a grid or other pattern, separate from or intertwined with text 106, and so forth. A displayed page 104 may also include other information besides text 106, displayed images 108, and displayed image metadata 110.

Figure 2:
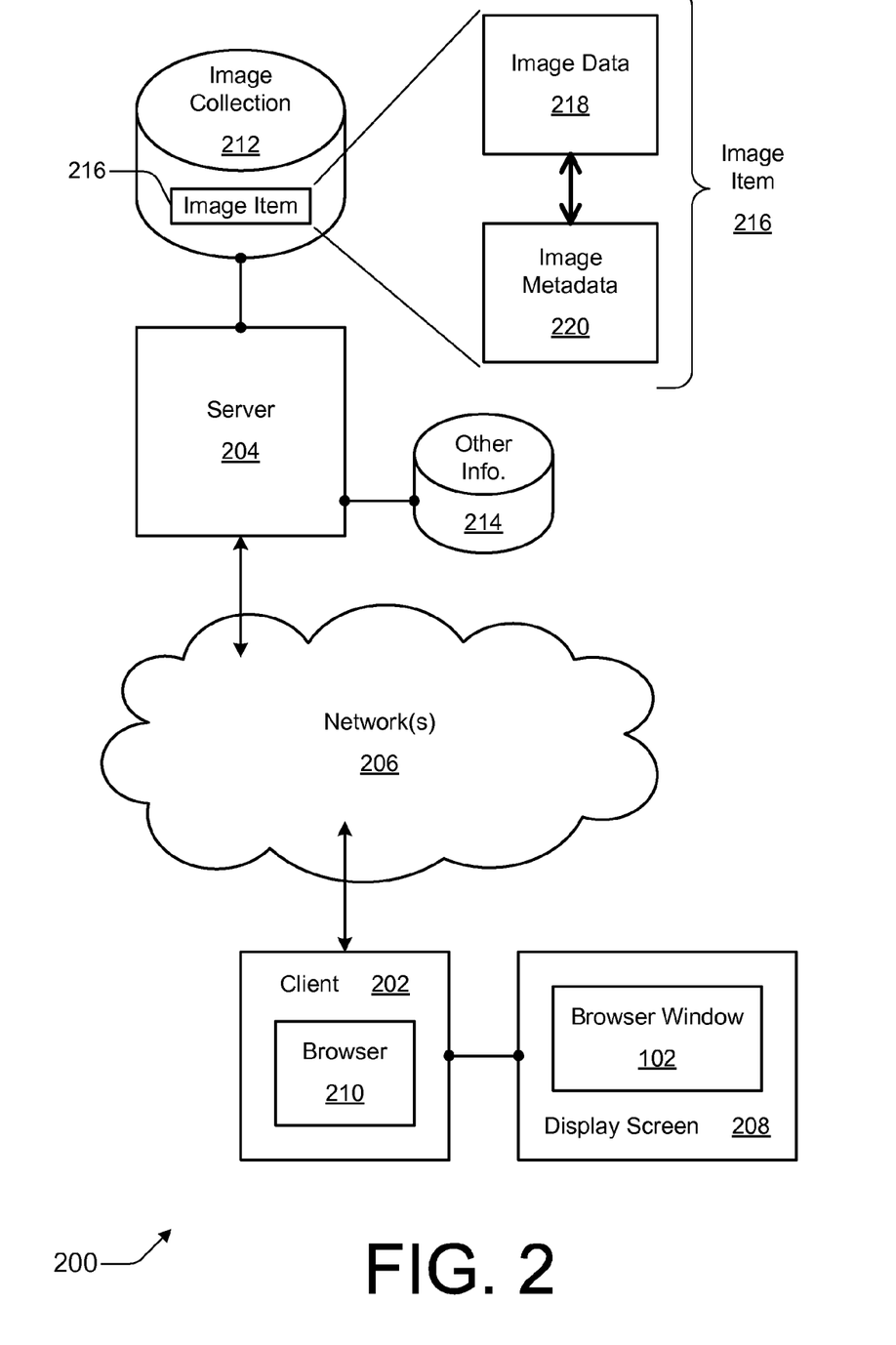
FIG. 2 is a block diagram of an example environment in which common metadata exposure for digital images may be implemented in conjunction with a browser and an image item.

FIG. 2 is a block diagram of an example environment 200 in which common metadata exposure for digital images may be implemented in conjunction with a browser 210 and an image item 216. As illustrated, environment 200 includes a client 202, a server 204, and one or more networks 206. Client 202 includes a display screen 208, and server 204 includes image collection 212 and other information 214.

In an example embodiment, client 202 and server 204 communicate over network(s) 206. Network(s) 206 may comprise, by way of example but not limitation, one or more of an internet, an intranet, a telephone network, a public network, a private network, a wired network, a wireless network, some combination thereof, and so forth. Communications between client 202 and server 204, such as those described herein below in the context of pages, may be transmitted over network 206.

Display screen 208 is coupled to and/or integrated with client 202. Client 202 includes at least one browser 210. Browser 210 produces browser window 102, which is displayed on display screen 208. Client 202 may be realized as a personal computer (e.g., workstation, desktop, notebook, etc.), an entertainment device (e.g., audio/visual player), a television or a set-top box therefor, a personal digital assistant (PDA), a mobile phone or other portable device, a gaming platform, any device that is capable of running a browser 210, some combination thereof, and so forth. An example device implementation that may be used to realize a client 202 and/or a server 204 is described herein below with particular reference to FIG. 9.

Browser 210 may be implemented as a proprietary browser, an open-source browser, and so forth. Browser 210 may be a separate application or it may be embedded in or otherwise be a part of another application, such as an operating system, an internet or other communications suite, and so forth. Examples of current browsers include, but are not limited to, INTERNET EXPLORER from MICROSOFT Corporation, SAFARI from APPLE Inc., MOZILLA FIREFOX, OPERA, KONQUEROR, NETSCAPE, and so forth.

Server 204 is coupled to and/or integrated with image collection 212 and other information 214. Image collection 212 and other information 214 may be implemented as separate collections of information or as a combined collection of information. They may be realized, for example, as one or more databases. These elements 204, 212, and 214 may be configured in any manner. Example configurations include, but are not limited to, at least one web server, a server farm, one or more servers connected to a storage area network (SAN), a server and a locally-attached non-volatile memory unit, some combination thereof, and so forth.

In an example embodiment, information from image collection 212 and/or other information 214 may be served as one or more pages of information. Image collection 212 includes information relating to images. Other information 214 includes non-image-related information, such as text. Image collection 212 includes multiple image items 216. Image items 216 of image collection 212 may be organized in any manner.

Each image item 216 may include image data 218 and image metadata 220. Image data 218 includes the data to render an image on a display screen. Image metadata 220 is associated with image data 218. Image metadata 220 contains one or more metadata values relating to the associated image data 218. Example metadata types include, but are not limited to, the file name of the image item, the date and/or time of the image data, a size of the image item, a height of the image data, a width of the image data, and so forth. Example attributes and characteristics of image item 216, including an example data structure for image metadata 220, are described further herein below with particular reference to FIG. 4.

In an example general operation, browser 210 at client 202 sends to server 204 over network 206 a request for information. In response, server 204 produces (e.g., constructs, retrieves, etc.) a page using image collection 212 and/or other information 214. The page includes the requested information. The page may be produced in a markup language format. By way of example only, a markup language format may comport with HTML, MICROSOFT HyperText Markup Language (MSHTML), Standard Generalized Markup Language (SGML), Extensible Access Markup Language (XAML), Extensible HTML (XHTML), Extensible Markup Language (XML), and so forth.

The page is sent from server 204 across network 206 to client 202. Browser 210 at client 202 then causes the page to be displayed in browser window 102 on display screen 208. The displayed view of the page can be manipulated at client 202 by browser 210 with script coding. In an example embodiment, the page is received from server 204 at client 202 with both a markup language portion and a scripting portion. These page portions and the processing thereof are described further below with particular reference to FIG. 3.

Figure 3:
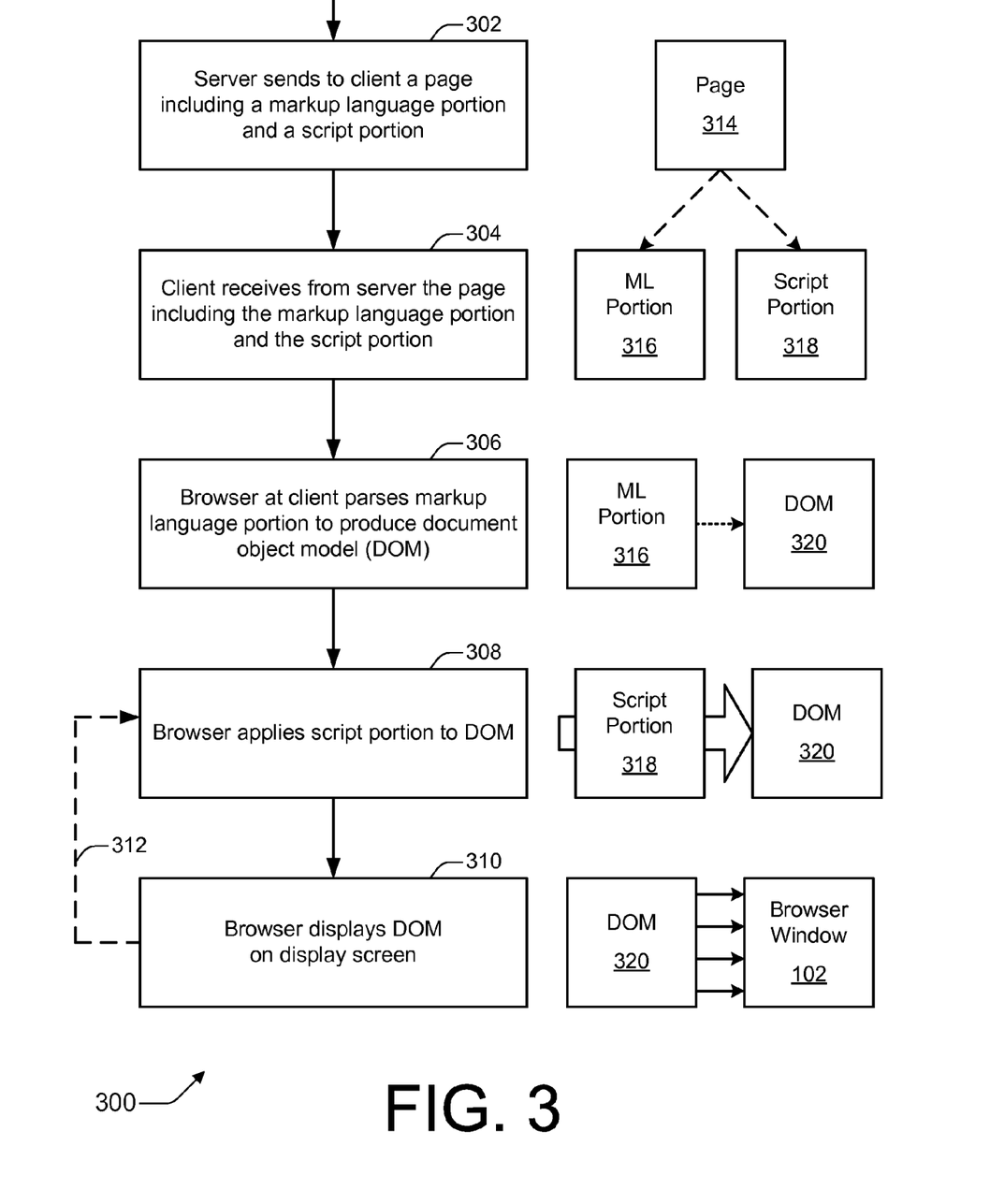
FIG. 3 includes a flow diagram that illustrates an example of a method for downloading and displaying a page with a browser.
Figure 6:
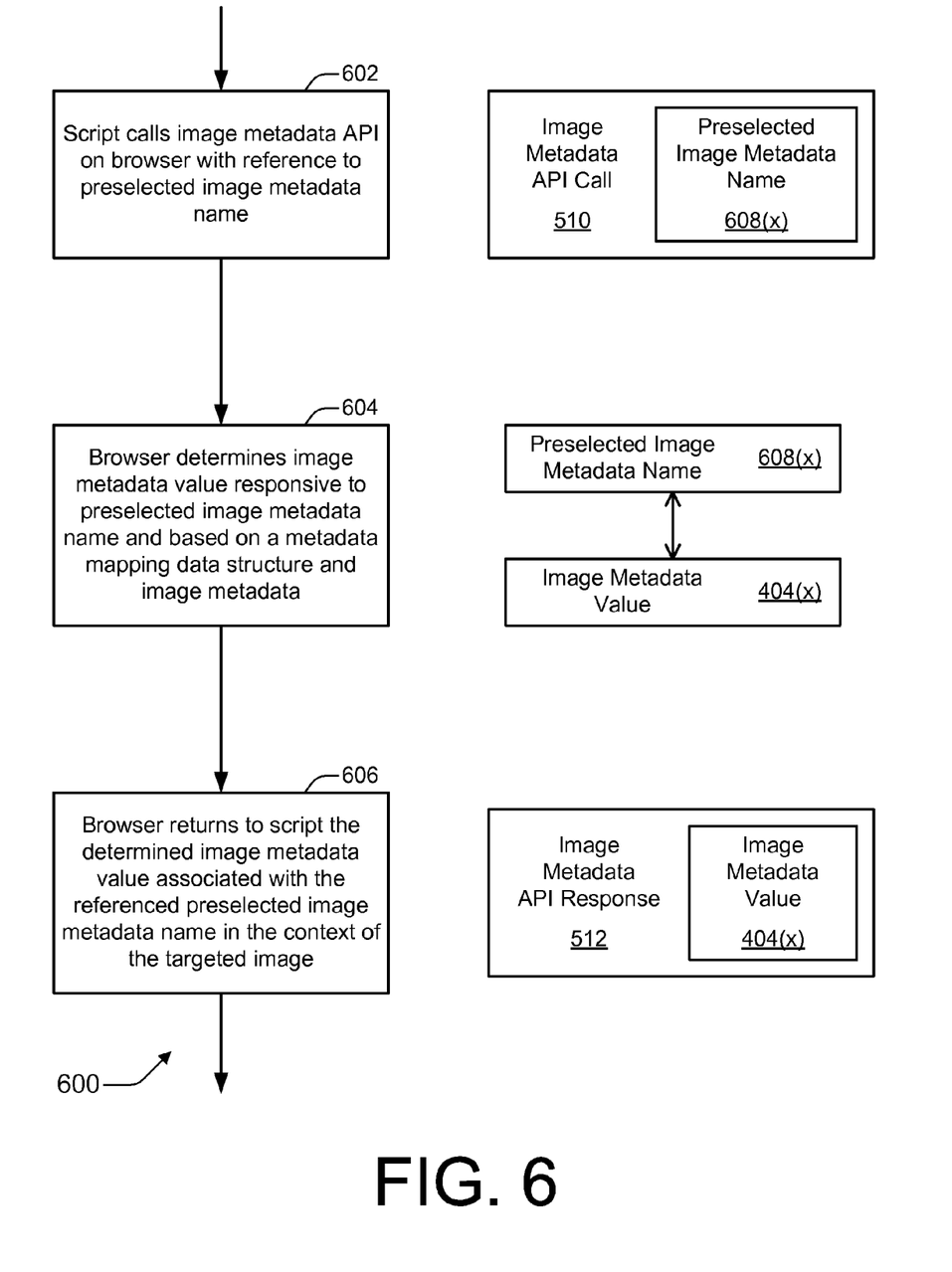
FIG. 6 includes a flow diagram that illustrates an example of a relatively general method for exposing common metadata in digital images using a preselected image metadata name.
Figure 8:
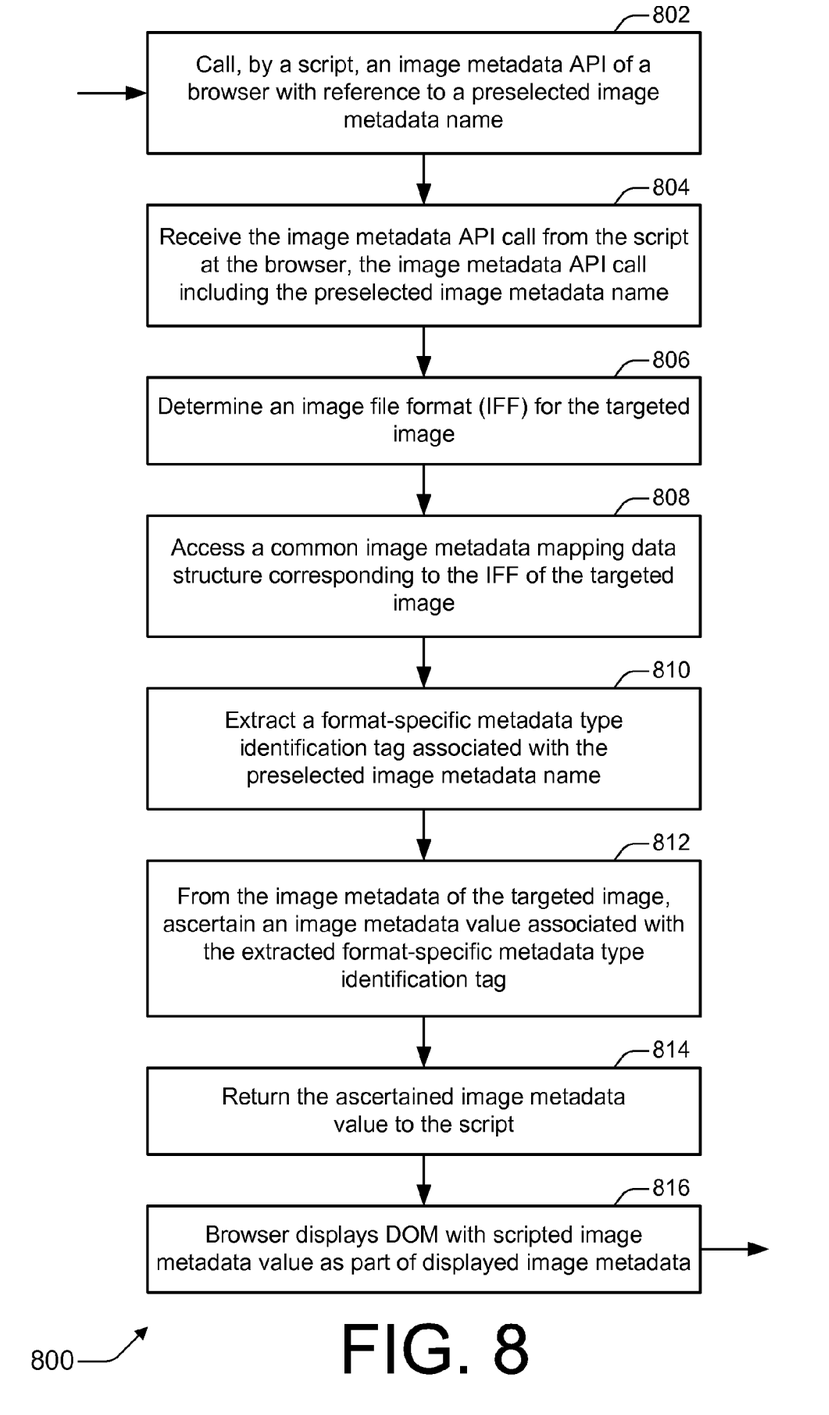
FIG. 8 is a flow diagram that illustrates an example of a relatively specific method for exposing common metadata in digital images using a common image metadata mapping data structure.

In the drawings, FIGS. 3, 6, and 8 are flow diagrams 300, 600, and 800, respectively. Implementations of flow diagrams 300, 600, and 800 may be realized, for example, as processor-executable instructions. Processor-executable instructions may be embodied as software, firmware, hardware, fixed logic circuitry, some combination thereof, and so forth. The acts of these flow diagrams may be performed in many different environments, by a number of different devices, and/or with a variety of different browser configurations. Hence, although the descriptions of certain blocks and the acts thereof reference other elements that are described herein, they do so by way of example only. The order in which the methods are described is not intended to be construed as a limitation, and any number of the described blocks can be combined, augmented, rearranged, and/or omitted to implement a respective method, or an alternative method that is equivalent thereto.

FIG. 3 includes a flow diagram 300 that illustrates an example of a method for downloading and displaying a page with a browser. Flow diagram 300 includes five (5) blocks 302-310 and a dashed arrow 312. FIG. 3 also includes five (5) other blocks 102 and 314-320 that further illuminate the example method. A server, a client, and a browser perform acts in flow diagram 300. These may correspond to, for example, server 204, client 202, and browser 210, respectively (each of FIG. 2). It should be understood that present and/or future approaches to downloading and displaying a page with a browser may differ from the specific example acts described with reference to flow diagram 300.

In an example embodiment, at block 302, a server sends to a client a page that includes a markup language portion and a script portion. For example, server 204 may send page 314 to client 202. At block 304, the client receives from the server the page that includes the markup language portion and the script portion. For example, client 202 may receive from server 204 a markup language (ML) portion 316 and a script portion 318 of page 314. Script portion 318 can comport with any one or more of many existing or new scripting formats. Example scripting formats include, but are not limited to, JAVASCRIPT, VBSCRIPT, ECMASCRIPT, and so forth.

At block 306, a browser at the client parses the markup language portion to produce a document object model (DOM) for the page. For example, browser 210 at client 202 may parse markup language portion 316 to produce a DOM 320 for page 314. For instance, the markup tags of markup language portion 316 may be transformed into objects of DOM 320.

At block 308, the browser applies the script portion to the DOM. For example, browser 210 may execute scripting code of script portion 318 on DOM 320. This may affect how and/or what parts of page 314 are displayed. At block 310, the browser displays the DOM on a display screen. For example, browser 210 may display DOM 320, as affected by script portion 318, in a browser window 102 on a display screen 208. As indicated by dashed arrow 312, script portion 318 can continuously, repeatedly, and/or occasionally (e.g., in response to user interaction) alter how it is affecting the display of DOM 320 in browser window 102.

2: Example Embodiments

Digital images are typically created, stored, and maintained in an image file format in accordance with some digital image standard. Digital image standards can be relatively proprietary, relatively open, and so forth. Example digital image standards include, but are not limited to, those that comport with a Joint Photographic Experts Group (JPEG) specification, a JPEG Interchange Format (JIF) specification, a Portable Network Graphics (PNG) specification, a Tagged Image File (TIF) specification, an Exchangeable Image File (EXIF) standard, HD PHOTO/WINDOWS MEDIA PHOTO from MICROSOFT Corporation, and so forth. Many camera manufacturers and some digital imaging software companies also issue their own digital image standards. Additionally, although two different files may share the same image file format, they may still have different sub-formats for the image metadata encoding. These sub-formats can result when, for example, the files are created with different software and/or devices. Thus, image file formats may also embrace sub-formats as well.

These digital image standards, among other things, specify how digital image metadata is to be configured and/or organized. For example, they can specify a metadata type identification tag that is associated with each type of metadata. Thus, image metadata may include multiple respective metadata type identification tags that are each respectively associated with a metadata value. An example image metadata organization is described herein below with particular reference to FIG. 4.

Example metadata types, which may have corresponding metadata type identification tags, are listed below. However, some digital image standards include different metadata types, fewer total metadata types, more total metadata types, and so forth. For instance, some standards define 10s, some define 100s, and some define 1000s or more of different image metadata types. Metadata type examples include, but are not limited to, camera manufacturer, camera model, compression type, X resolution, Y resolution, time, date, ambient conditions (e.g., lighting), embedded sound, global positioning system (GPS) coordinates, and so forth. Furthermore, metadata types of the various digital image standards can also include user added/provided information such as author, copyright information, one or more keywords, a voice annotation, combinations thereof, and so forth. It should be understood that metadata type refers to a kind of metadata as described above and not necessarily to a variable category.

Figure 4:
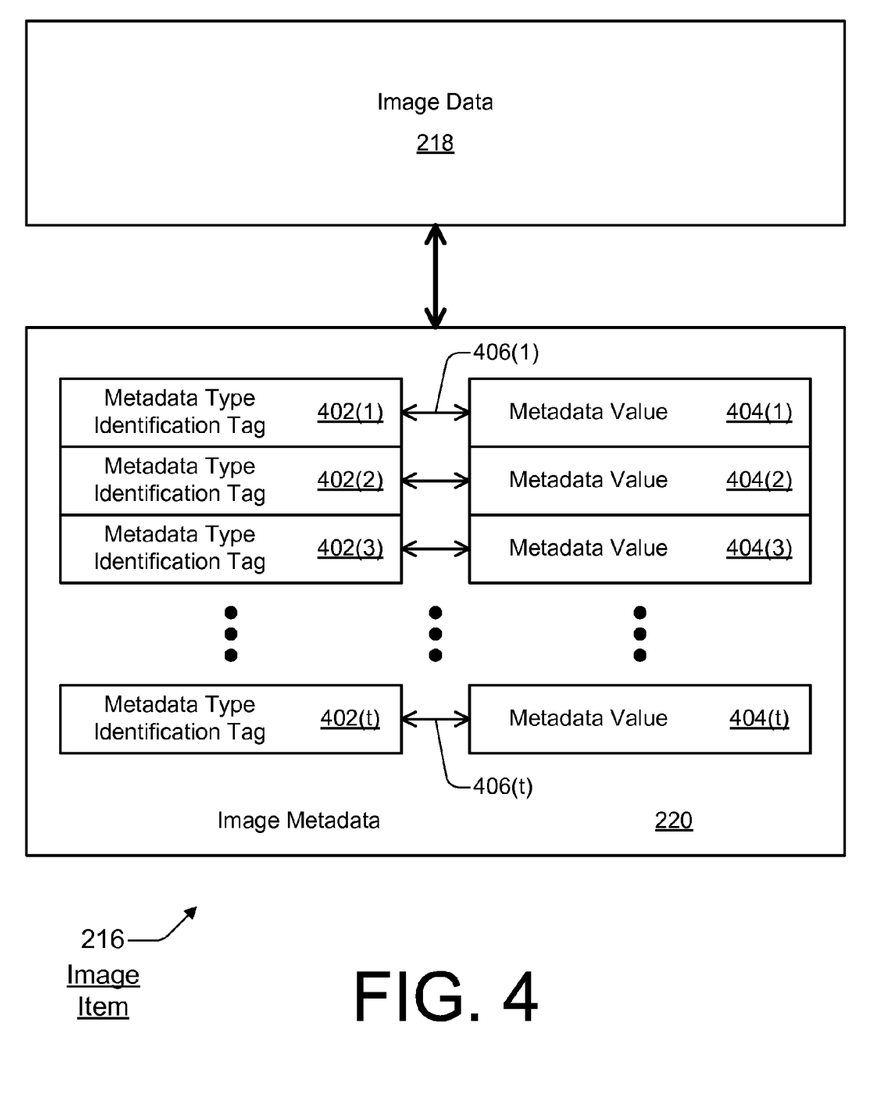
FIG. 4 is a block diagram of an example image item including image data and image metadata.

FIG. 4 is a block diagram of an example image item 216 including image data 218 and image metadata 220. As illustrated, image metadata 220 includes multiple mapping associations 406 between metadata type identification tags 402 and metadata values 404. Image metadata 220 includes "t" mapping associations 406(1) ... 406(t) having metadata type identification tags 402(1) ... 402(t) and metadata values 404(1) ... 404(t), respectively. The variable "t" represents some integer.

Specifically, metadata type identification tag 402(1) is associated with image metadata value 404(1). Metadata type identification tag 402(2) is associated with image metadata value 404(2). Metadata type identification tag 402(3) is associated with image metadata value 404(3). And metadata type identification tag 402(t) is associated with image metadata value 404(t). Image metadata 220 may include any number of mappings from zero, one, two, and so forth.

Thus, in an example embodiment, each mapping 406(x) associates a respective metadata type identification tag 402(x) with a respective metadata value 404(x), with "x" being a generic variable taking on a value for "t". Metadata type identification tag 402 identifies the meaning of the associated metadata value 404. Metadata type identification tag 402 may be implemented as a name, a number, some other (e.g., alphanumeric) character or combination of characters, and so forth.

For an example embodiment, these metadata type identification tags 402 are defined by the corresponding image file format of the applicable digital image standard of image item 216. The term "tags" may comprise tags, fields, keys, etc. as used in the various standards. Some standards, by way of example only, use one, two, or more characters as a hexadecimal number to represent each metadata type identification tag 402. For instance, a metadata type identification tag 402 of "IF" may be associated with a metadata value 404 representing a date that image data 218 was acquired. A desired particular image metadata value 404(x) may be extracted from image metadata 220 by referencing or otherwise using the associated particular metadata type identification tag 402(x) of the associated mapping 406(x).

Different digital image standards specify different metadata types and different total numbers of metadata types. For example, the JIF and PNG standards define on the order of tens of different metadata types. The JPEG and TIF standards define on the order of hundreds of different metadata types. Other standards can also define thousands or more of different metadata types.

Digital image standards also usually define different metadata type identification tags to be associated with the same metadata type. In other words, a metadata type identification tag of "0B3" may be associated with a date metadata type in a first standard, may be associated with a compression ratio metadata type in a second standard, may be undefined in a third standard, and so forth.

Even if the metadata type identification tag differs between standards for the same metadata type, there are some common metadata types that are included in most, if not all, standards. For example, a date an image is taken is a relatively common metadata type. As explained above, the associated metadata type identification tag can, and often does, vary between different digital image standards. As described herein below, an image metadata API enables at least some of these common metadata types to be accessed without a user or web developer knowing a particular metadata type identification tag for a given image file format as defined in some corresponding digital image standard.

Figure 5:
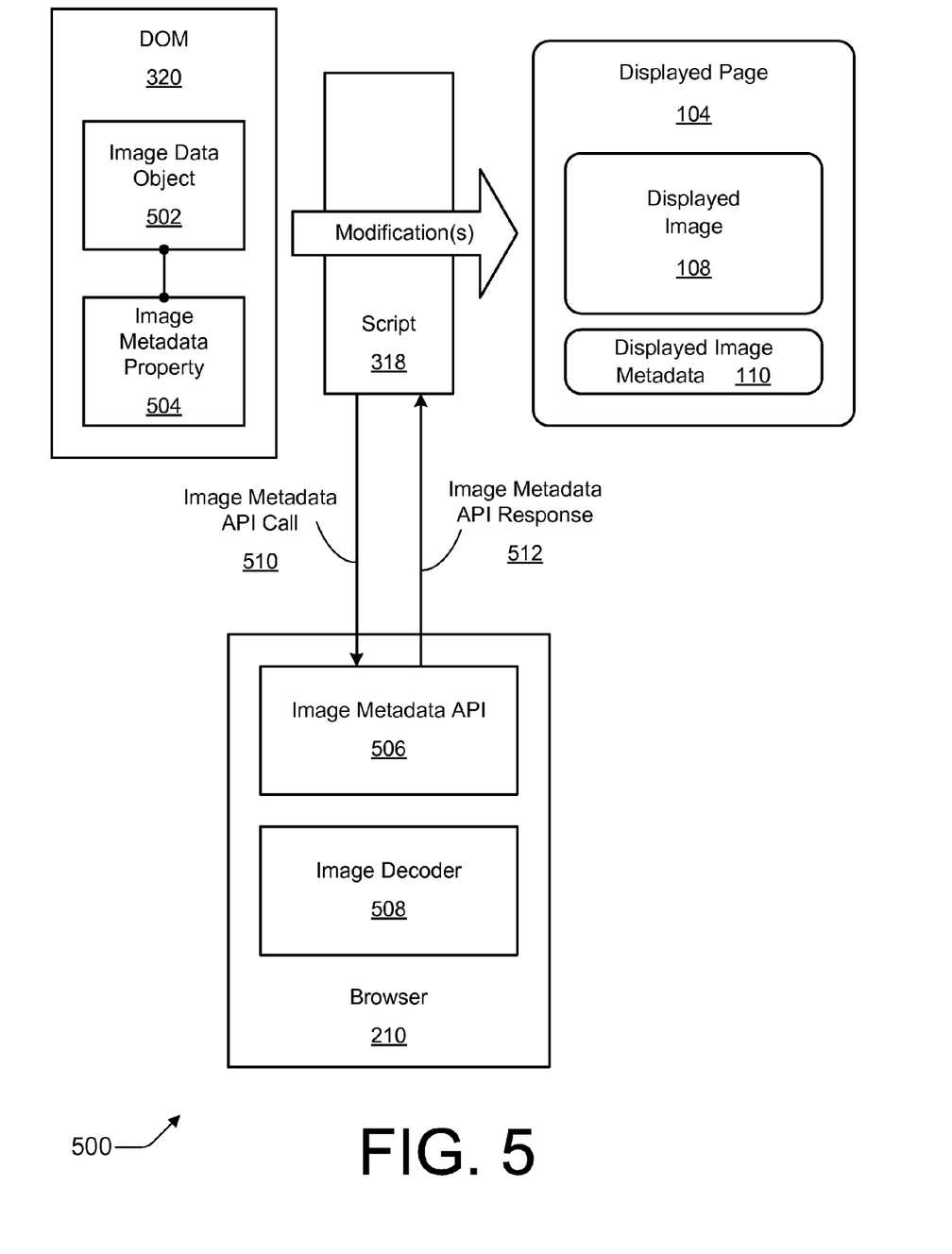
FIG. 5 is a block diagram of an example scheme for exposing common metadata in digital images using an image metadata API of a browser.

FIG. 5 is a block diagram of an example scheme 500 for exposing common metadata in digital images using an image metadata API 506 of a browser 210. As illustrated, scheme 500 includes a DOM 320, a script 318, a displayed page 104, and browser 210. DOM 320 includes an image data object 502 and an image metadata property 504. Browser 210 includes image metadata API 506 and image decoder 508. Displayed page 104 includes displayed image 108 and displayed image metadata 110 that is associated therewith.

In an example embodiment, scheme 500 also includes an image metadata API call 510 and an image metadata API response 512. Generally, image metadata API call 510 and image metadata API response 512 enable one or more values of image metadata to be displayed for a particular image under the control of script 318. This API exchange enables script 318 to modify or otherwise affect what image metadata is displayed. Thus, script 318 may affect what image metadata is displayed by way of insertion, addition, deletion, replacement, and so forth. Script 318 may effect such changes by changing markup language portion 316 or DOM 320 directly. Browser 210 can propagate changes to markup language portion 316 to DOM 320 prior to displaying it.

As described above with particular reference to FIG. 3, browser 210 parses a markup language portion 316 of a page 314 to produce DOM 320. This parsing typically produces objects from tagged parts of markup language portion 316. Image data object 502 is produced from and corresponds to image data 218 (of FIG. 2). Image metadata property 504 is produced from and corresponds to image metadata 220. Image metadata property 504 can include the metadata value(s) of image metadata 220.

In an example implementation, image decoder 508 decodes any image items 216 included in markup language portion 316. This usually occurs during the parsing, but it may be performed fully or partially at another time, including in response to an image metadata API call 510. Image metadata API 506 enables script 318 to interact with browser 210, including image decoder 508, so as to make image metadata property 504 accessible to page developers that write script 318.

As described above, different digital image standards define different metadata type identification tags for a single metadata type having the same underlying semantic meaning. Instead of requiring the page developer to know the correct metadata type identification tag for every possible digital image standard, a predetermined (but adjustable) finite number of preselected common image metadata types are enabled for access using image metadata API call 510. Each preselected common image metadata type is referenced using a preselected image metadata name. Example embodiments are described in further detail herein below with particular reference to FIGS. 6-8.

In operation of an example embodiment, script 318 sends an image metadata API call 510 to image metadata API 506. By way of example only, such an image metadata API call 510 may be formulated similar to: "ImageName.CommonMetadata.PreselectedImageMetadataName". The 'ImageName' portion references a targeted image item 216. The 'CommonMetadata' portion may be a literal that indicates that a preselected image metadata name is being included. The 'PreselectedImageMetadataName' portion represents the preselected image metadata name.

Browser 210, using image decoder 508, ascertains a metadata value that is associated with the preselected image metadata name for the targeted image. A common image metadata mapping data structure may be used as intermediate link to connect a doubly-linked association chain between a preselected image metadata name and the desired image metadata value. An example common image metadata mapping data structure is described herein below with particular reference to FIG. 7. The ascertained metadata value is returned to script 318 in image metadata API response 512. The returned metadata value may then be displayed as at least part of displayed image metadata 110.

FIG. 6 includes a flow diagram 600 that illustrates an example of a relatively general method for exposing common metadata in digital images using a preselected image metadata name. Flow diagram 600 includes three (3) blocks 602-606. FIG. 6 also includes four (4) other blocks 404(x), 510, 512, and 608(x) that further illuminate the example method. A browser and script code perform acts in flow diagram 600. These may correspond to, for example, browser 210 and script portion 318, respectively (of FIGS. 2, 3, and 5).

In an example embodiment, at block 602, a script calls an image metadata API on a browser with reference to a preselected image metadata name. For example, a script 318 may make to an image metadata API 506 of a browser 210 an image metadata API call 510 referencing a preselected image metadata name 608(x).

At block 604, the browser determines an image metadata value responsive to the preselected image metadata name and based on a metadata mapping data structure and image metadata. For example, browser 210, using image decoder 508, may determine an image metadata value 404(x) that is associated with the referenced preselected image metadata name 608(x). This may entail ascertaining two levels of associations using a common image metadata mapping data structure as well as the decoded image metadata 220 of the targeted image. This ascertainment of each layer of two layers of associations is described further herein below with particular reference to FIG. 8.

At block 606, the browser returns to the script the determined image metadata value that is associated with the referenced preselected image metadata name in the context of the targeted image. For example, browser 210 may send to script 318 an image metadata API response 512 including image metadata value 404(x). The returned metadata value 404(x) may then be displayed as part of displayed page 104.

Figure 7:
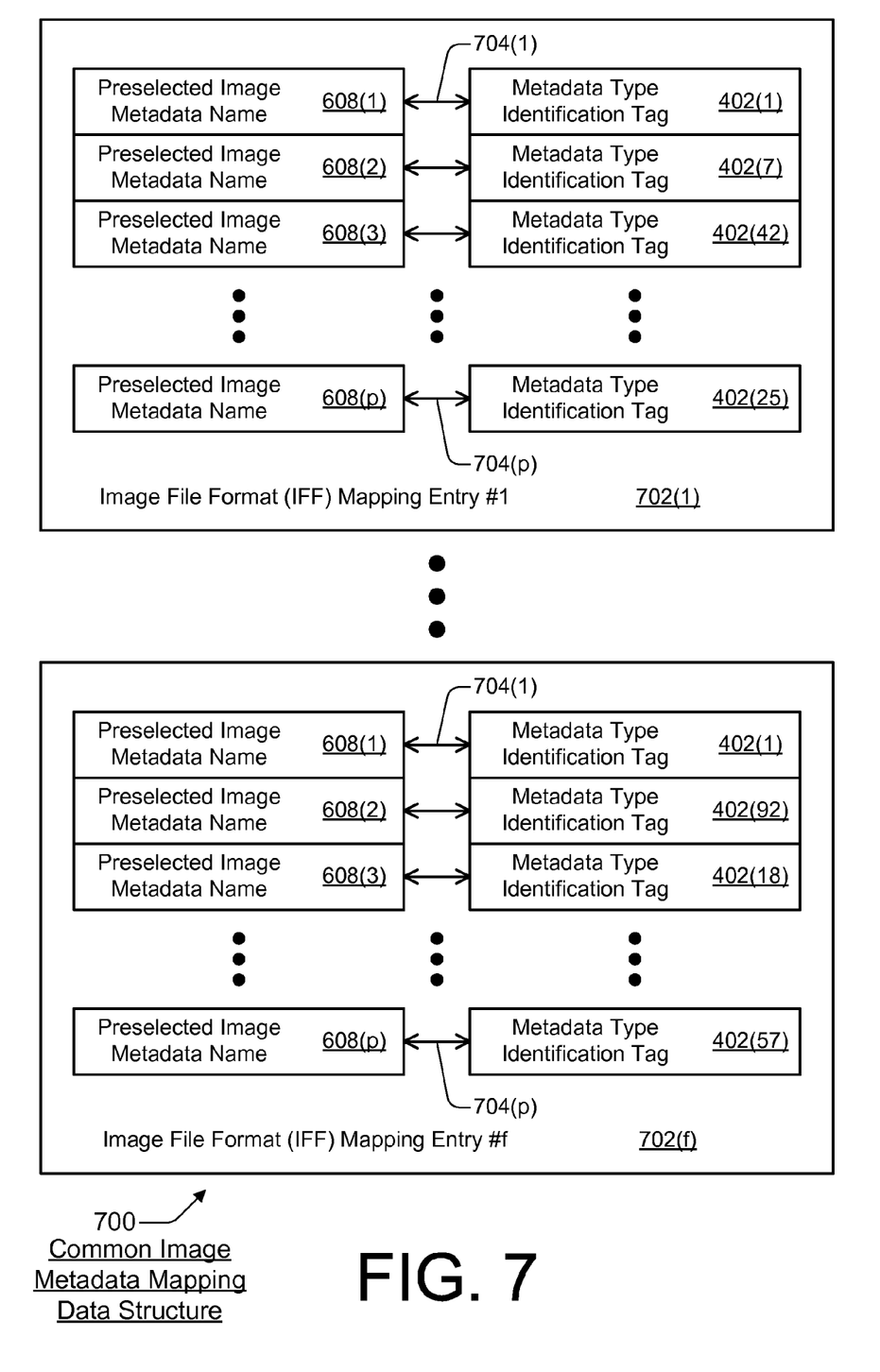
FIG. 7 is a block diagram of an example common image metadata mapping data structure that maps respective preselected image metadata names to respective metadata type identification tags.

FIG. 7 is a block diagram of an example common image metadata mapping data structure 700 that maps preselected image metadata names 608 to metadata type identification tags 402. As illustrated, common image metadata mapping data structure 700 includes at least one image file format (IFF) entry 702. Specifically, it includes "f" image file format mapping entries 702(1) . . . 702(f), with "f" representing some integer. Each image file format mapping entry 702 includes "p" association fields 704(1) . . . 704(p), with "p" representing some integer.

In an example embodiment, each respective image file format mapping entry 702 corresponds to a respective digital image standard. Thus, each respective image file format mapping entry 702 maps preselected image metadata names to metadata type identification tags defined by a respective digital image standard. In an example alternative, each image file format mapping entry 702 may be directed to a particular sub-format or may have multiple sub-format mappings therein. Within each image file format mapping entry 702, each association field 704 maps a respective preselected image metadata name 608(x) to a respective metadata type identification tag 402(x) of the corresponding digital image standard.

In a described implementation, the set of preselected image metadata names 608(1) . . . 608(p) are common within each image file format mapping entry 702 throughout common image metadata mapping data structure 700. With such an example implementation, a page developer can choose a preselected image metadata name with reasonable assurance that a valid metadata value, if present, is returned in response to an image metadata API call 510. However, the tag value of the metadata type identification tag 402(x) for a given preselected image metadata name 608(x) can, and likely will, vary between any two image file format mapping entries 702. In other words, the tag value of a metadata type identification tag 402(x) may be "3C4" in one image file format mapping entry 702 and "4D" in another.

In an example embodiment, a predetermined number "p" of preselected image metadata names 608 may have a corresponding association field 704 within each image file format mapping entry 702. However, this number "p" may be expanded or contracted, even after deployment. Additionally, the number of image file format mapping entries 702 may be increased (or decreased), especially as new digital image standards are introduced (or retired). Common image metadata mapping data structure 700 may be included, for example, as part of browser 210, including as part of image metadata API 506 and/or image decoder 508.

For an example embodiment, image metadata types that are to be given preselected image metadata names are selected for implementation based on their commonality across digital image standards, based on their popularity of usage for page displays, some combination thereof, and so forth. However, other criterion or criteria may be applied to select the "p" image metadata types to be given preselected image metadata names. Preselected image metadata names may include, by way of example but not limitation, Keywords, DateTaken, ImageSize, ImageHeight, ImageWidth, and so forth.

By implementing certain example embodiment(s) from one or more of scheme 500 (of FIG. 5), flow diagram 600 (of FIG. 6), and common image metadata mapping data structure 700 (of FIG. 7), image metadata capabilities are expanded. For example, browser users can copy a public image from a web site and acquire the keywords and/or description that the image is tagged with. Furthermore, the speed of keyword searches on, e.g., image sharing sites may be increased by obviating the need to query keyword information from a heavily-used server across a network.

The image metadata properties may be readable, read-only, writeable, and so forth. For the read/read-only properties, the image metadata may be read using a metadata reader. For writeable properties, the image metadata may be written to using a metadata writer. Hence, users of web applications and other applications that can handle markup-language-based files are able to read from and write to image metadata without necessitating server interaction.

FIG. 8 is a flow diagram 800 that illustrates an example of a relatively specific method for exposing common metadata in digital images using a common image metadata mapping data structure. Flow diagram 800 includes eight (8) blocks 802-816. A browser and a script code perform acts in flow diagram 800. These may correspond to, for example, browser 210 and script portion 318, respectively (of FIGS. 2, 3, and 5).

In an example embodiment, at block 802, a script calls an image metadata API of a browser with reference to a preselected image metadata name. For example, script 318 may send an image metadata API call 510 to image metadata API 506 of browser 210 with a reference to a preselected image metadata name 608(x). At block 804, the browser receives from the script the image metadata API call that includes the preselected image metadata name. For example, image metadata API 506 of browser 210 may receive from script 318 image metadata API call 510 that includes preselected image metadata name 608(x).

At block 806, an image file format (IFF) for the targeted image is determined. For example, image decoder 508 of browser 210 may determine the image file format corresponding to the targeted image 216. At block 808, a common image metadata mapping data structure at a mapping entry corresponding to the image file format of the targeted image is accessed. For example, browser 210 may access a common image metadata mapping data structure 700 at an image file format mapping entry 702 that corresponds to an image file format of the targeted image 216.

At block 810, a format-specific metadata type identification tag associated with the preselected image metadata name is extracted. For example, for the image file format mapping entry 702 corresponding to the image file format of the targeted image 216, a metadata type identification tag 402(x) that is included in an association field 704 corresponding to the received preselected image metadata name 608(x) is extracted. In other words, an association field 704 corresponding to the received preselected image metadata name 608(x) is located so that the metadata type identification tag 402(x) associated with the received preselected image metadata name 608(x) may be extracted.

At block 812, from the image metadata of the targeted image, an image metadata value associated with the extracted format-specific metadata type identification tag is ascertained. For example, from image metadata 220 (e.g., of FIG.

4) of the targeted image 216, an image metadata value 404(x) that is associated with the extracted format-specific metadata type identification tag 402(x) may be extracted. Thus, a metadata type identification tag 402 is ascertained from a preselected image metadata name 608 using one association 704 (e.g., at block 810), and an image metadata value 404 is ascertained from the metadata type identification tag 402 using another association 406 (e.g., at block 812). Hence, a two-level mapping association may be used to determine an image metadata value 404 from a preselected image metadata name 608.

At block 814, the ascertained image metadata value is returned to the script. For example, image metadata API 506 may return the ascertained image metadata value 404(x) to script 318 in an image metadata API response 512. At block 816, the browser displays the DOM with the scripted image metadata value as part of displayed image metadata. For example, browser 210 may display DOM 320 with the scripted image metadata value 404 being included as part of displayed image metadata 110 in relation to displayed image 108.

As noted above, image metadata API 506 of browser 210 may be write-capable as well as read-capable. For a writing implementation, image metadata API 506 receives an image metadata API call 510 for writing that includes a preselected image metadata name and a new image metadata value. Browser 210 replaces a current image metadata value with the new image metadata value so that the new image metadata value is associated with the metadata type identification tag in the image metadata of the targeted image.

Example Device Implementations for Exposing Common Metadata in Digital Images

Figure 9:
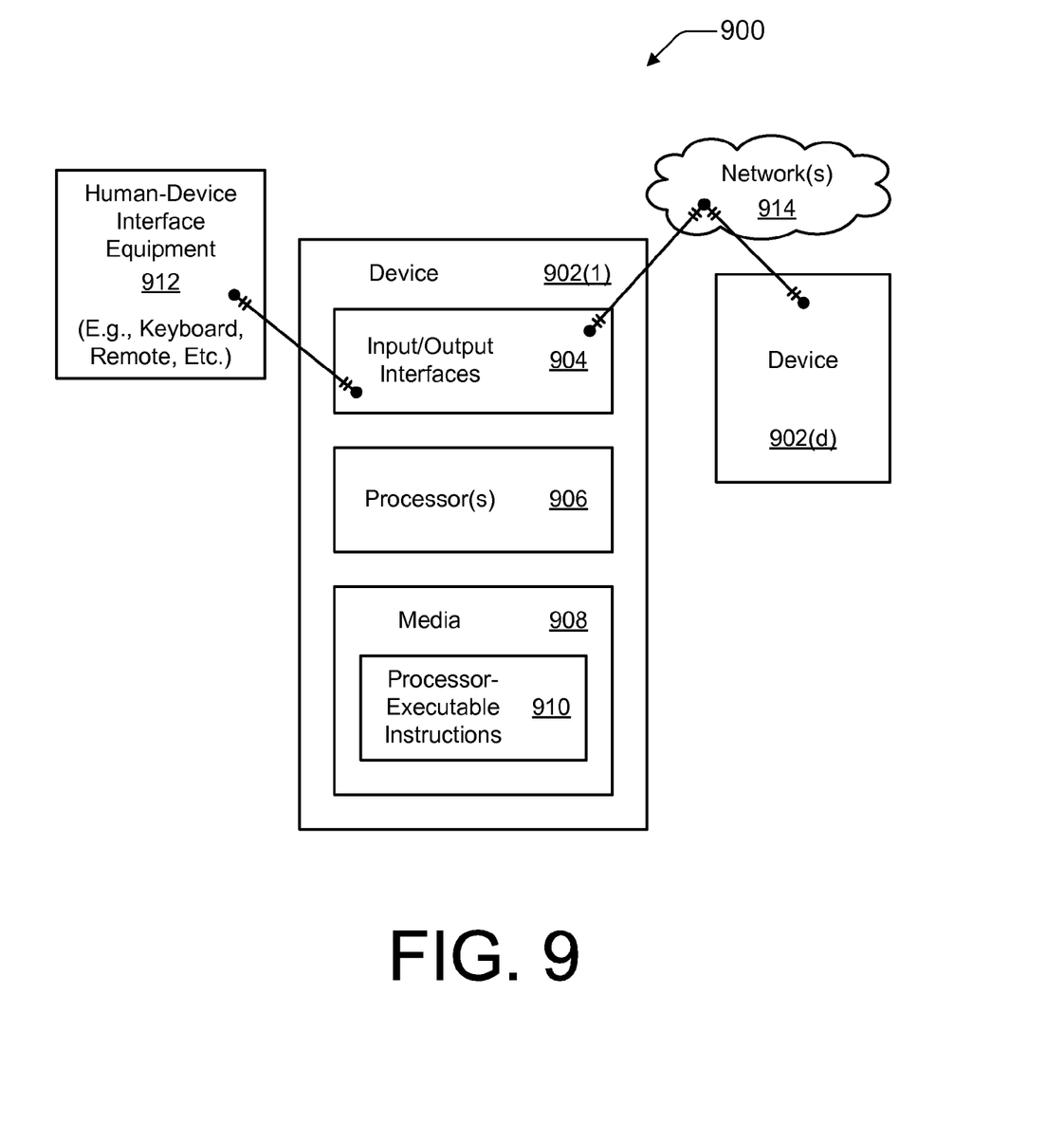
FIG. 9 is a block diagram of an example device that may be used to implement embodiments for exposing common metadata in digital images.

FIG. 9 is a block diagram 900 of an example device 902 that may be used to implement common metadata exposure with digital images. As illustrated, two devices 902(1) and 902(d) are capable of engaging in communications via network(s) 914, with "d" representing an integer. Although two devices 902 are specifically shown, one or more than two devices 902 may be employed, depending on implementation. Network(s) 914 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth. Alternatively, two devices 902 may be directly connected.

Generally, a device 902 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 902 includes one or more input/output (I/O) interfaces 904, at least one processor 906, and one or more media 908. Media 908 include processor-executable instructions 910.

In an example embodiment of device 902, I/O interfaces 904 may include (i) a network interface for communicating across network 914, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) human-device interfaces include those that communicate by wire or wirelessly to human-device interface equipment 912 (e.g., a keyboard, a remote, a mouse or other graphical pointing device, etc.).

Generally, processor 906 is capable of executing, performing, and/or otherwise effectuating processor-executable instructions, such as processor-executable instructions 910. Media 908 is comprised of one or more processor-accessible media. In other words, media 908 may include processor-executable instructions 910 that are executable by processor 906 to effectuate the performance of functions by device 902. Processor-executable instructions may be embodied as software, firmware, hardware, fixed logic circuitry, some combination thereof, and so forth.

Thus, realizations for common metadata exposure with digital images may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 906 may be implemented using any applicable processing-capable technology, and one may be realized as a general purpose processor (e.g., a central processing unit (CPU), a microprocessor, a controller, etc.), a graphics processing unit (GPU), a derivative thereof, and so forth. Media 908 may be any available media that is included as part of and/or accessible by device 902. It includes volatile and non-volatile media, removable and non-removable media, storage and transmission media (e.g., wireless or wired communication channels), hard-coded logic media, combinations thereof, and so forth. Media 908 is tangible media when it is embodied as a manufacture and/or as a composition of matter. For example, media 908 may include an array of disks or flash memory for longer-term mass storage of processor-executable instructions 910, random access memory (RAM) for shorter-term storing of instructions that are currently being executed and/or otherwise processed, link(s) on network 914 for transmitting communications, and so forth.

As specifically illustrated, media 908 comprises at least processor-executable instructions 910. Generally, processor-executable instructions 910, when executed by processor 906, enable device 902 to perform the various functions described herein. Such functions include, but are not limited to: (i) those acts that are illustrated in flow diagrams 300, 600, and 800 (of FIGS. 3, 6, and 8, respectively); (ii) those provided by the illustrated data structures (e.g., of FIGS. 4 and 7); (iii) those of scheme 500 (of FIG. 5); other procedures described herein; combinations thereof; and so forth.

The devices, acts, aspects, features, functions, procedures, modules, data structures, techniques, components, parts, etc. of FIGS. 1-9 are illustrated in diagrams that are divided into multiple blocks and other elements. However, the order, interconnections, interrelationships, layout, etc. in which FIGS. 1-9 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for common metadata exposure with digital images.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. One or more storage media comprising processor-executable instructions stored thereon that, when executed by a client device, cause the client device to implement a browser configured to:
    process a page of information configured to display a targeted image that carries associated image metadata including an image metadata application programming interface (API) call;
    invoke an image metadata API included with the browser to:
        receive the image metadata API call pertaining to the targeted image and including a preselected image metadata name;
        extract, at the client device, an image metadata value that is associated with the preselected image metadata name from the image metadata carried by the targeted image using a common image metadata mapping data structure that maps preselected image metadata names to metadata type identification tags; and
        respond with the extracted image metadata value;
    add at least the extracted image metadata value as static text in a mark-up language document at the client device in lieu of adding at least the extracted image metadata value as static text in the mark-up language document at a server device, the mark-up language document defining the page of information to cause the extracted image metadata value to be displayed in association with the targeted image when the page of information is rendered by the browser; and
    render the page of information to display the extracted image metadata value as static text in an image metadata block displayed proximate to the targeted image in the rendered page of information within a document display portion of the browser.

2. The one or more storage media as recited in claim 1, wherein the browser is to ascertain a metadata type identification tag that is associated with the preselected image metadata name received in the image metadata API call using the common image metadata mapping data structure.

3. The one or more storage media as recited in claim 2, wherein the browser is to ascertain the associated image metadata value from the image metadata carried by the targeted image using the ascertained metadata type identification tag.

4. The one or more storage media as recited in claim 1, wherein the browser includes the common image metadata mapping data structure; wherein the common image metadata mapping data structure comprises multiple image file format mapping entries, each respective image file format mapping entry corresponding to a respective image file format; and wherein each image file format mapping entry includes multiple association fields, each association field mapping a respective preselected image metadata name to a respective metadata type identification tag for the corresponding image file format.

5. The one or more storage media as recited in claim 1, wherein the image metadata API is to expose a read capability and a write capability with respect to image metadata of image items.

6. The one or more storage media as recited in claim 1, wherein the page of information includes a markup language portion and a script portion; the markup language portion including the targeted image, the targeted image carrying both image data and the image metadata that is associated therewith, the script portion to make the image metadata API call to the image metadata API and to receive the associated image metadata value from the image metadata API; and wherein the browser is to parse the markup language portion to produce a document object model (DOM).

7. The one or more storage media as recited in claim 1, wherein the targeted image is part of an image collection that includes multiple image items and the page of information is obtained from the image collection.

8. A method comprising:
    receiving, from a page that includes a markup language portion and a script portion, an image metadata application programming interface (API) call from the script portion of the page, the call including a preselected image metadata name and pertaining to a targeted image;
    ascertaining a metadata type identification tag that is associated with the preselected image metadata name including accessing a common image metadata mapping data structure that maps a predetermined finite number of preselected image metadata names to metadata type identification tags for multiple image file formats;
    parsing the markup language portion to produce a model of the markup language portion so as to include an image metadata property that corresponds to image metadata that is included as part of the targeted image;
    extracting an image metadata value from the image metadata included as part of the targeted image including ascertaining the image metadata value that is associated with the ascertained metadata type identification tag from the image metadata property of the model;
    returning the image metadata value extracted from the image metadata;
    adding at least the metadata value extracted from the image metadata as static text in a mark-up language document defining a browser page configured to display the targeted image; and
    rendering the browser page to display the image metadata value extracted from the image metadata as static text in an image metadata block displayed proximate to the targeted image in the browser page within a document display portion of the browser.

9. The method as recited in claim 8, wherein:
    the act of returning comprises returning the image metadata value extracted from the image metadata to the script portion of the page; and
    the acts of receiving, ascertaining a metadata type identification tag, extracting an image metadata value, and returning are performed by a browser.

10. The method as recited in claim 8, wherein the act of ascertaining a metadata type identification tag comprises:
    determining an image file format of the targeted image;

accessing an image file format mapping entry corresponding to the determined image file format, the image file format mapping entry including multiple association fields; and extracting the metadata type identification tag from an association field of the multiple association fields that corresponds to the preselected image metadata name.

11. The method as recited in claim 8, wherein the method further comprises:

presenting image data for the targeted image; and presenting the image metadata value ascertained from the image metadata.

12. The method as recited in claim 8, wherein the method further comprises:

receiving the page that includes the markup language portion and the script portion, the markup language portion including the targeted image comprising image data and the image metadata, and the script portion having coding to make the image metadata API call.

13. The method as recited in claim 12, wherein:

the act of parsing comprises parsing the markup language portion to produce the model as a document object model (DOM) so as to include an image data object corresponding to the image data of the targeted image and the image metadata property corresponding to the image metadata included as part of the targeted image; and the act of extracting the image metadata value comprises ascertaining the image metadata value that is associated with the ascertained metadata type identification tag from the image metadata property of the image data object of the DOM.

14. The method as recited in claim 8, wherein the method further comprises:

receiving an image metadata API writing call that includes the preselected image metadata name and a new image metadata value; and replacing the image metadata value extracted from the image metadata with the new image metadata value so that the new image metadata value is associated with the ascertained metadata type identification tag in the image metadata included as part of the targeted image.

15. The method as recited in claim 8, wherein the targeted image is part of an image collection that includes multiple image items and the page is obtained from the image collection.

16. A client device comprising:

one or more processors;

one or more processor-accessible storage media including processor-executable instructions stored thereon, the processor-executable instructions comprising:

an image metadata application programming interface (API) to receive an image metadata API call and that includes a common image metadata mapping data structure having a particular association field that associates preselected image metadata names to metadata type identification tags;

a page of information obtained by the client device from an image collection, the page of information comprising a markup language portion and a script portion, wherein:

the markup language portion includes an image item having image data and image metadata, the image metadata associating respective metadata values with respective metadata type identification tags according to the common image metadata mapping data structure, the image metadata including a particular metadata value that is associated with a particular metadata type identification tag; and the script portion includes a call to the browser image metadata API with reference to a particular preselected image metadata name, the script portion to receive in response to the browser image metadata API call the particular metadata value extracted from the image metadata included as part of the image item and cause the particular metadata value to be added as static text in the mark-up language portion for the page of information to enable the particular image metadata value to be displayed in an image metadata block displayed proximate to the image item when the page of information is rendered by a browser within a document display portion of the browser.

17. The client device as recited in claim 16, wherein the client device further comprises an image decoder to ascertain the respective metadata value for the image item included in the markup language portion.

18. The client device as recited in claim 17, wherein the image decoder is included as part of the browser.

19. The client device as recited in claim 16, wherein the client device includes the browser and the browser image metadata API is implemented by the browser.

20. The client device as recited in claim 19, wherein the browser is to determine an image file format of the image item; wherein the browser is to locate the particular association field in an image file format mapping entry corresponding to the determined image file format of the image item; and wherein the browser is to determine the particular metadata value responsive to the particular preselected image metadata name of the browser image metadata API call and based on the particular association field of the common image metadata mapping data structure and the particular metadata type identification tag of the image metadata.

* * * * *